Jan. 13, 1970  H. MARCEL  3,489,319
CLOSURE AND SEALING PROCESS
Filed Dec. 26, 1967  2 Sheets-Sheet 1

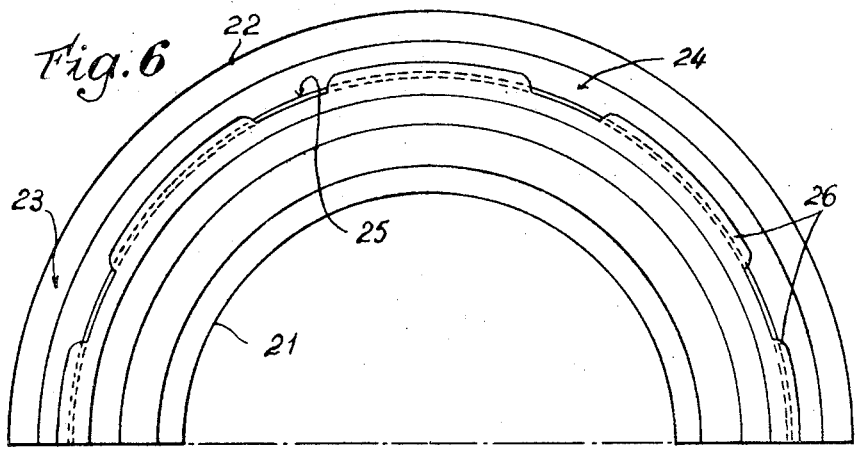
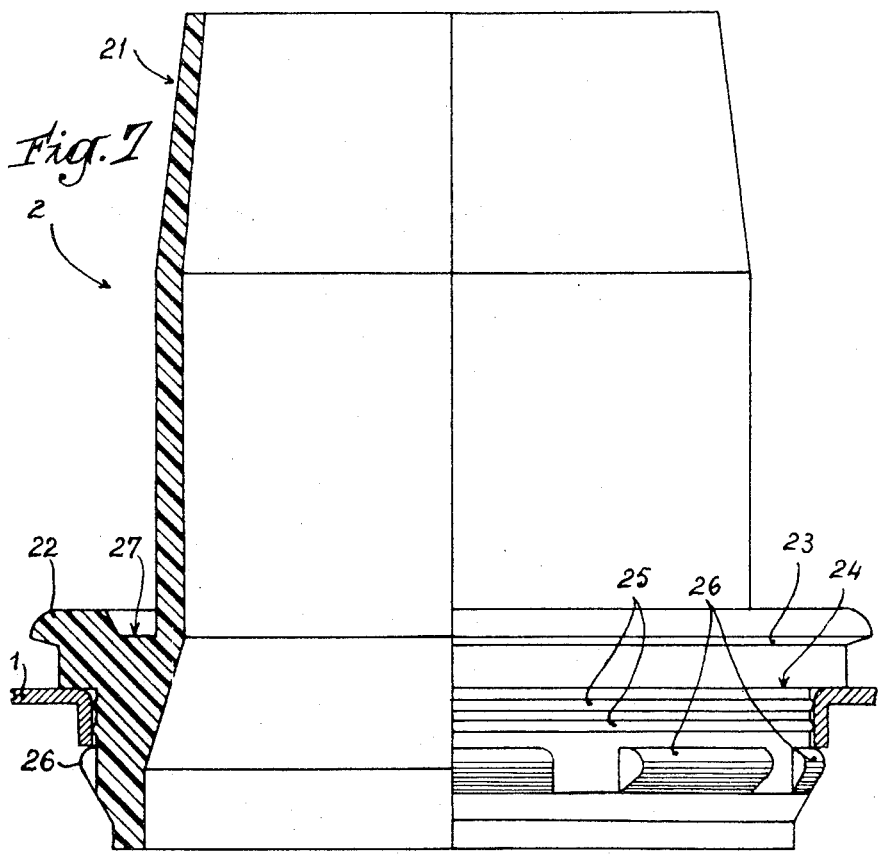

United States Patent Office 3,489,319
Patented Jan. 13, 1970

3,489,319
CLOSURE AND SEALING PROCESS
Henri Marcel, Les Cheres, Rhone, France
Filed Dec. 26, 1967, Ser. No. 693,386
Claims priority, application France, Dec. 30, 1966,
48,121
Int. Cl. B67d 5/32; B67b 5/00
U.S. Cl. 222—153                                    6 Claims

ABSTRACT OF THE DISCLOSURE

The invention relates to a process for sealing containers in which a cap is first fixed on a spout made of plastic material and after filling the container, the base of the spout is pressed into the opening of said container. The invention also relates to a closure comprising a spout and a cap made of plastic material each provided with fitting means near each of their ends and forming a rigid unit by encasing the spout in the cap, the spout having also snapping means at its base.

---

The present invention relates to a process for sealing containers with a non-integral spout, more particularly cans, canisters, bottles and similar packages, and to a closure, more particularly for carrying out said process.

In some types of containers, particularly in the metal cans, the spout is a separate piece made of plastic material which is fixed into an opening of the can top. The spout is generally fixed in this opening by the snap action of a bead placed at the base of the spout. This bead snaps at the back of the container opening. After the spout has been fixed on the container, the latter is filled, then sealed by some form of closure, preferably a tamper-proof one.

For assembling, the separate spouts are generally brought above the containers and forced into the opening of the latter by means of an alternating mechanism.

In practice, these relatively thin-walled spouts frequently fail to withstand the operation. Squeezed by the fixing tool, they sometimes collapse and quite a number of containers come out of the assembly machine with a warped spout or without any spout at all. All these containers must be sorted out and sent again to the assembling machines, which slows down the production.

On the other hand, the sealing after filling requires that the containers pass to another machine, which burdens the costs with another operation.

It is an object of the invention to avoid these disadvantages. It provides a process for sealing containers having a non-integral spout, in which a cap is first fixed on a spout made of plastic material and provided with a bead at its base, and after filling the container, the base of the spout is pressed into the opening of said container until the said bead snaps into said opening.

It is also an object of the present invention to provide a closure comprising a spout and a cap made of plastic material, each provided with fitting means near each of their ends and forming a rigid unit by encasing the spout in the cap, the spout having also snapping means at its base.

The spout with its cap forms a rigid unit, easy to fix on the opening of the container without any risk of warping, rupture or other damage during the assembling operation.

In a preferred embodiment of the invention, guarantee means are provided, preferably of the type described in the French Patent No. 1,489,177 of the same inventor.

Certain specific embodiments of the invention will be described by way of example with reference to the accompanying drawings in which:

FIG. 6 is a magnified plan view of the spout from below.

FIG. 7 is an elevation with partial section of the spout fixed on the can, the fixation skirt and guarantee band removed.

Figure 1:
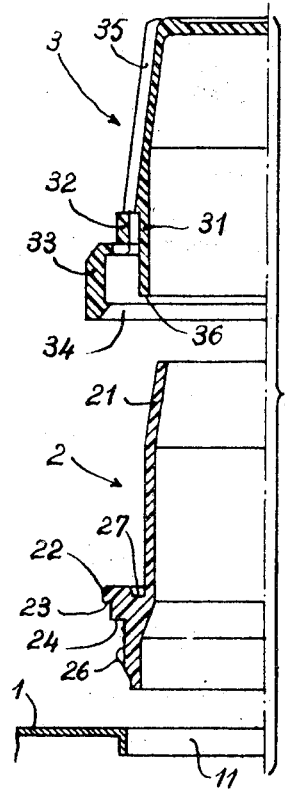
FIG. 1 is a schematic longitudinal half-section of a can top, a spout and a cap one above the other.

Referring to FIG. 1 the top 1 of a metal can has a circular opening 11 with an annular rim. This opening is adapted to receive a spout 2 which is a non-integral piece of plastic material. As shown in greater detail in FIGURES 6 and 7, this spout 2 comprises a substantially cylindrical body with a frusto-conical end 21. The base of this body widens into a rim 22 which presents a groove 27 and two superposed annular steps 23 and 24, the top one, 23, having a greater diameter than the lower one, 24. Below the latter, the rim 22 is provided with two annular beads and several bead segments 26 suitably spaced.

The spout 2 is adapted to receive a cap 3 with guarantee means preferably of the type described in the French Patent No. 1,489,177. It may be briefly recalled that these means comprise a cover 31 connected to a skirt 33 of greater diameter by a tearing band 32. The cap with guarantee means is one moulded piece of plastic material. The tearing band 32 is connected to the cover 31 and to the lower skirt 33 by suitable tearing lines. In the embodiment described, the lower part of the skirt is provided with a chamfered rim 34 and the top 35 of the cover 31 has a frusto-conical shape adapted to mate with the top 21 of the spout 2, as will be explained hereinafter.

Figure 2:
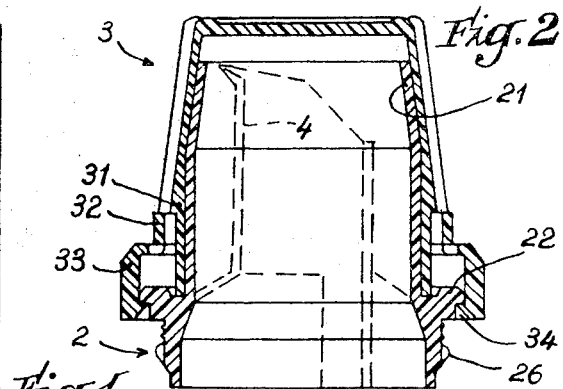
FIG. 2 is an axial section of the spout and the cap assembled.

According to the invention, the cap 3 and the spout 2 are first assembled. By pushing the spout 2 into the cap 3, the chamfered rim 34 of the skirt 33 snaps under the top step 23 of the rim 22 as shown in FIG. 2. Besides this snapping action, when encasing one part into the other, the frusto-conical end of the cap mates with the corresponding end of the spout and the lower rim 36 of the cap fits into the groove 27 of the spout rim. In this way, fitting means being provided near each of their ends, the two elements together form a unit of exceptional rigidity.

After filling, the cans are brought to a machine of known type with an alternating mechanism, supplied with units 2–3 of the kind shown in FIG. 2.

Figure 3:
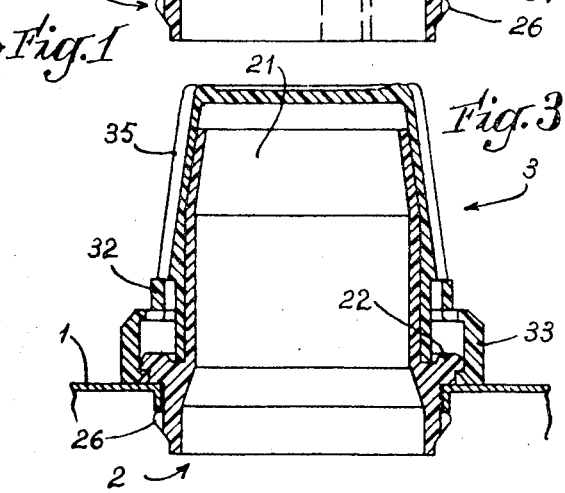
FIG. 3 is the same as FIG. 2, but with the spout and cap fixed on the can top.

Fixing such rigid units on the top 1 of each can presents no difficulties. As shown in FIG. 3, the lower end of the base of the spout 2 is engaged with the opening 11. The circular edge of the opening fits into the lower step 24 and the bead segments 26 snap below the rim of the said opening. The spout base being forced into the opening, the annular beads 25 provide a tight fit.

Figure 4:
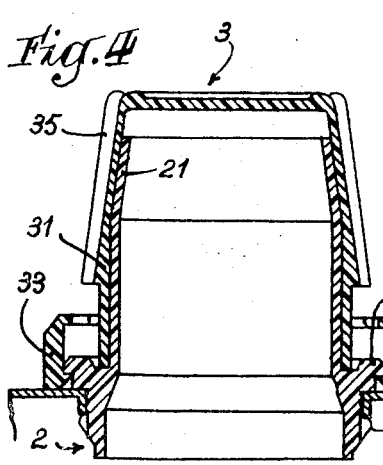
FIG. 4 is the same section as FIG. 3, but with the guarantee means removed.
Figure 5:
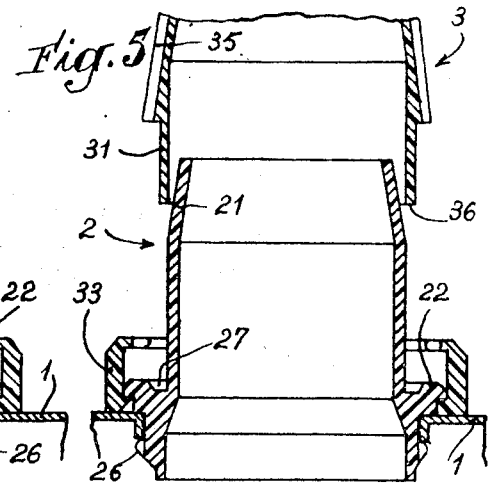
FIG. 5 is the same as FIG. 4, but with the cap removed.

The can is thus sealed with a tamper-proof closure. To reach its contents, the tearing band 32 is torn off (FIG. 4) to free the cover 31 from the rest of the guarantee means, the skirt 33 being retained on the rim of the spout 2 by the chamfered rim 34. The can may be then emptied as usual and closed with the cover 31, the frusto-conical part 21 and 35 mating with each other.

The sealing of the container is therefore simply realized by fixing the non-integral spout 2, the later being rigid thanks to the cap, thus preventing any damage or failure during the fixing operation.

The foregoing embodiments have been given only as illustration of the invention and should not be construed as limiting. In particular, the closure described could be used on plastic containers as well as on metal cans. In another embodiment of the invention, the spout could comprise flow-dividing walls or a pouring spout such as shown by dotted lines 4 in FIG. 2. Finally, the fitting means provided by the lower rim 36 of the cap and the groove 27 of the spout rim can be completed or supplemented by the lower cylindrical part of the cover 31 and the corresponding cylindrical part of the spout near its base.

I claim:

1. A closure for a container having a wall formed with an opening defined by an edge portion of said wall, comprising an elongated tubular spout having opposed open ends one of which is situated at an inner end region of said spout which is adapted to extend through said opening of said container wall and the other of which is situated at an outer end region of said spout through which the contents of the container are to be discharged, said spout being made of a resilient plastic material and having at its inner end region outwardly projecting bead means and outwardly projecting rim means axially spaced from each other to receive said edge portion of said container wall between themselves in a fluid-tight manner, said rim means being situated at the exterior of the container and being undercut along its periphery to define an outwardly projecting lip spaced from and facing said container wall, a cover of tubular configuration substantially complementing the configuration of said spout slidably telescoped onto the latter and having an outer closed end normally closing said outer end region of said spout, said tubular cover also being made of a springy plastic and having an inner end region adapted to engage said container wall when positioned about said spout and formed with an inwardly directed lip surrounding said spout engaged between said lip of said spout and said container wall so that said lips coact to retain said cover on said spout, and a tear band forming part of said cover and situated at a location extending around part of said spout between said opposed ends thereof and between said lip and closed end of said cover so that upon removal of said tear band the part of the cover which remains on said outer end region of said spout can be removed therefrom.

2. The combination of claim 1 and wherein said outer end region of said spout and the complementary part of said cover are of frusto-conical configuration.

3. The combination of claim 1 and wherein said spout is formed with an annular groove located at the junction between said rim and a tubular wall of said spout with said groove directed away from the interior of the container, and said cover having an inner tubular wall portion extending into said groove and engaging said spout therein and said inner tubular wall portion being surrounded by a portion of said cover which terminates in said lip thereof.

4. The combination of claim 3 and wherein said portion of said cover which terminates in said lip thereof includes said tear band.

5. The combination of claim 4 and wherein said tubular spout and said cover are both of a right cylindrical configuration at a region extending from said groove of said spout to the frusto-conical portions of said spout and cover.

6. The combination of claim 1 and wherein said spout has between said bead means and rim additional beads for enchancing the fluid-tight mounting of the spout on the container wall.

References Cited

UNITED STATES PATENTS

| 3,005,570 | 10/1961 | Maulaz | 220—54 |
| 3,128,900 | 4/1964 | Chaboche. | |
| 3,235,117 | 2/1966 | Mason | 215—46.5 X |

FOREIGN PATENTS 222,616  7/1959  Australia.

ROBERT B. REEVES, Primary Examiner

NORMAN L. STACK, JR., Assistant Examiner

U.S. Cl. X.R.

222—182